Patented Nov. 10, 1953

2,658,925

UNITED STATES PATENT OFFICE 2,658,925

HIGHER ALKYLPHENYL NITROGEN COMPOUNDS

Moses Cenker, Wyandotte, and William K. Langdon, Grosse Ile, Mich., assignors to Wyandotte Chemicals Corporation, Wyandotte, Mich., a corporation of Michigan No Drawing. Application March 2, 1950, Serial No. 147,335

2 Claims. (Cl. 260—645)

The present invention relates to higher alkylphenyl nitrogen compounds, specifically those in which $NO_2$ and $NH_2$ groups are linked to the benzene nucleus. Such novel compounds may be alternatively termed kerylnitrobenzenes and kerylphenylamines, due to the nature of the derivation of the alkyl or "keryl" group, as hereinafter defined.

Alkylphenyl nitro compounds have been known in the art for a long time. Thus, Krafft prepared an alkylnitrobenzene whose alkyl group contained 16 carbon atoms, specifically eso-nitrocetyl-benzene. See Berichte vol. 19, p. 2984 (1886). Baur, on the other hand, prepared a series of artificial musks, based on nitrated alkylbenzene compounds, and in which lower alkyl groups having a total of 7 carbon atoms were present, as exemplified by the compound amylnitroxylene. See U. S. Pat. No. 481,685 (1892).

Since this early work of Krafft and Baur, it is remarkable to observe that with the exception of the disclosure of the butylnitrocymene of U. S. Pat. No. 1,892,128, workers in this field of alkylnitrobenzene compounds have failed to synthesize or disclose any such compounds, wherein the alkyl group or groups contain a total carbon atom content of over 8 and less than 16.

SUMMARY OF INVENTION

The subject matter of our invention is directed to this heretofore unexplored field of the pertinent art. The novel chemical compounds of our invention are exemplified by the formula:

where R is selected from the group consisting of normal and branched chain alkyl groups having 11-14 carbon atoms, and mixtures of such groups; and X is selected from the group consisting of $-O_2$ and $-H_2$.

More precisely, our new compounds comprise alkylnitrobenzenes of the formula:

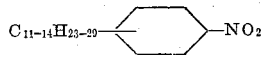

and hydrogen reduction derivatives thereof: namely, alkylaminobenzenes of the formula:

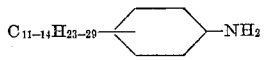

The starting material employed in the synthesis of our new compounds is an alkylbenzene hydrocarbon, whose alkyl portion corresponds to that of a relatively pure, individual aliphatic hydrocarbon (i. e., any one of the following: hen-decyl, dodecyl, tridecyl or tetradecyl); or corresponds to a mixture of such alkyl groups. Such alkyl groups may be derived from alkanes, alkenes, polymerized alkenes, and monohydroxy alkanols. Such alkylbenzenes may be prepared by the Friedel-Crafts condensation of a chlorinated petroleum hydrocarbon distillate with benzene, as disclosed in U. S. Pat. No. 2,220,099; by the condensation of a normal- or polymer-olefin, or an alkanol with benzene in the presence of a condensation catalyst. Preferably, we employ an alkylbenzene whose alkyl portion is derived from a petroleum hydrocarbon and thus corresponds to a mixture of $C_{11-14}$ alkyl groups. This preferred form of starting material has the additional advantage of being highly economical in that it is available as a relatively low-cost product from the petroleum industry.

Thus, a compound exemplifying our invention is synthesized from an alkylbenzene prepared by the condensation of n-dodecene and benzene in the presence of $H_2SO_4$ catalyst. The resultant dodecylbenzene is then nitrated at a temperature of 20° C. with a nitrating agent consisting of a mixture of 3 parts by weight of 95% $H_2SO_4$ to 1 part by weight of 70% $HNO_3$. The reaction mass, after separation of the spent acid layer, is washed with water until the wash water becomes neutral, then distilled under vacuum to remove residual benzene and water. The product, dodecylnitrobenzene may be reduced by catalytic hydrogenation, in the presence of Raney nickel catalyst, to produce the amino derivative: dodecylphenylamine.

In the nitration step of the process for producing the alkylnitrobenzenes of our invention, we have found that the $H_2SO_4$—$HNO_3$ mixture should preferably be in the range of 1.5-4.0 mols of $H_2SO_4$ per mol of $HNO_3$.

The following examples set forth in detail additional synthesizing processes for compounds within the preferred scope of our invention.

Example 1

The starting material employed in this example was an alkylbenzene termed "kerylbenzene" prepared by the chlorination of an aliphatic petroleum hydrocarbon distillate, or kerosene, boiling within the range of 187-245° C. at 760 mm.; and hence essentially consisting of a mixture of normal and branched chain alkanes containing 11-14 carbon atoms. (Cf. boiling points of pure alkanes in "Science of Petroleum," vol. II, pp. 1332-41, 1938, Oxford University Press.) This alkyl chloride was then condensed with benzene in the presence of $AlCl_3$ catalyst, the spent catalyst being settled out and unreacted hydrocarbons being removed by distillation.

This alkylbenzene or kerylbenzene as it is more commonly called by chemists in the art, was then placed, in the amount of 260 g. or approximately 1 mol, in a three-necked, round-bottomed flask, fitted with a condenser, a dropping funnel, a mechanical stirrer, and surrounded by a cooling bath. A mixture of 204 g. of 95.5% sulfuric acid (1.99 mols), 112.5 g. (1.25 mols) of 70% nitric acid and 15 g. of water was added to the kerylbenzene over a period of 20 minutes while stirring and maintaining the temperature of the reaction mixture at 20–25° C. The mixture was stirred for 1 hour after the addition was completed. The organic layer was then separated, washed with five 600 ml. portions of water (until wash water was neutral), and dehydrated under vacuum by heating on a steam bath. There was obtained 255 g. of alkylnitrobenzene product, corresponding to a yield of 0.98 g. per gram of kerylbenzene starting material.

On analysis, the nitrogen content of this kerylnitrobenzene product was found to be 2.7% as compared to 4.6% theoretical nitrogen content for a mono-nitrated kerylbenzene of 260 molecular weight.

*Example 2*

The alkylbenzene or kerylbenzene starting material employed in this example was derived from a petroleum distillate fraction boiling in the range of 192–237° C., and hence contained essentially a mixture of alkyl groups of 11–13 carbon atoms content.

A mixture of 200 g. of 95.5% sulfuric acid (1.95 mols) and 50 g. (0.557 mols) of 70% nitric acid were charged to the flask of a set-up similar to that described in Example 1, and the mixture cooled to a temperature of −2° C. The mixture was stirred and 130 g. (0.5 mol) of the kerylbenzene added over a period of 2 hours and 10 minutes. The temperature of the reaction was maintained at 0±2° C. during the addition and for 45 minutes after the addition was completed. The reaction mixture was poured on 300 g. of cracked ice and the upper organic layer separated. The product was washed successively with an equal volume of water, 525 g. of 5% sodium bicarbonate solution, and again with water. It was then taken up in benzene, washed with three 150 ml. portions of water, and the benzene and residual water removed by distillation to a final temperature of about 100° C. at 10 mm. pressure. The alkylnitrobenzene product weighed 135 g., equivalent to a yield of 1.04 g. of product per gram of kerylbenzene starting material.

The effect of variables such as the ratio of $H_2SO_4$ to $HNO_3$, temperature of reaction, and order of addition of reactants; are all illustrated by the following examples which were performed with the same kerylbenzene starting material, the same apparatus, as noted in the following table, under the same procedure as above described in Example 2.

TABLE

| Example No. | Charge | | | | | Temp., ° C. | Mode of addition | Yield Weight of product on basis of weight of kerylbenzene starting material |
|---|---|---|---|---|---|---|---|---|
| | $H_2SO_4$, g. | $HNO_3$, g. | Mol ratio $H_2SO_4/HNO_3$ | $H_2O$, g. | K. B., g. | | | |
| 3 | 204 | 112.5 | 1.6/1 | ------ | 260 | 20 | Acid to K. B. | 0.98 |
| 4 | 204 | 112.5 | 1.6/1 | 15 | 260 | 9–13 | do | 1.02 |
| 5 | 200 | 50 | 3.5/1 | ------ | 130 | 0 | do | 0.95 |
| 6 | 125 | 50 | 2.18/1 | ------ | 130 | 20 | do | 1.05 |
| 7 | 125 | 50 | 2.18/1 | ------ | 130 | 20 | K. B. to acid | 1.08 |
| 8 | 600 | 200 | 2.6/1 | ------ | 520 | 20 | Acid to K. B. | 0.81 |

The following examples illustrate the manner in which the kerylnitrobenzene of our invention is reduced to kerylphenylamine.

*Example 9*

A mixture of 29 g. (ca. 0.1 mol) of kerylnitrobenzene (from Example 2), 56 g. (1.0 mol) of iron powder, and 50 ml. of 50% aqueous ethanol were charged to a flask fitted with a reflux condenser, dropping funnel, and mechanical stirrer. The mixture was stirred rapidly and a solution of 5 ml. of concentrated hydrochloric acid in 20 ml. of 50% aqueous ethanol added portionwise over a period of 20 minutes. The flask became quite warm during the addition. After the flask had cooled, the dropping funnel was replaced by a thermometer and the mixture was refluxed for 1.5 hours. The mixture was then filtered and the solid washed with 95% ethanol. The filtrate was made acid with concentrated hydrochloric acid and distilled at reduced pressure to remove the alcohol and water, then made basic with NaOH (50% solution) and vacuum steam distilled. After failing in this attempt to vacuum steam distill the amine from basic solution, the organic layer was taken up in benzene and distilled. After removing the benzene and residual water, the amine was distilled at 1 mm. pressure. There was obtained 13 g. of kerylphenylamine boiling in the range of 120–170° C. at this pressure and having a 4.8% nitrogen content, by analysis.

*Example 10*

A solution of 30 g. (ca. 0.1 mol) of kerylnitrobenzene (distilling in the range of 173–186° C. at 1–2 mm. Hg pressure) in 200 ml. of absolute alcohol was charged to a 400 ml. centrifuge bottle. Two teaspoonful (ca. 18 g.) of [1] W-4

[1] Prepared according to method of Pavlic and Adkins, J. Am. Chem. Soc. 68, 1471 (1946).

Raney nickel catalyst was added and the bottle connected to a Parr low pressure hydrogenation apparatus. The bottle was evacuated and hydrogen introduced at an initial pressure of 48.5 p. s. i. g. The hydrogen pressure was maintained between 40 and 50 p. s. i. g. for 28 hours while 0.302 mols hydrogen was taken up. The catalyst was separated from the product by filtration, washed with 40 ml. of ethanol, and the combined filtrate and washings distilled. After removing the alcohol at atmospheric pressure, the product was rectified at 1-2 mm. pressure. There was obtained 22.9 g. of kerylphenylamine, boiling at 135-166° C., 1-2 mm. Hg pressure. This corresponded to an 86% yield on the basis of the nitrogen analysis of the kerylnitrobenzene starting material. The kerylphenylamine product contained 5.8% nitrogen, by analysis.

Other hydrogenation procedures may be employed beside those described in Examples 9 and 10 such as by chemical reduction with stannous chloride, or hydrogenation in the presence of a metallic platinum catalyst.

The new compounds of our invention are valuable as oxidation inhibitors, corrosion inhibitors and rust proofing agents, in the industrial arts. They are also valuable intermediates in the preparation of additional compounds such as N-kerylphenylbenzenesulfonamide (prepared from kerylphenylamine and benzenesulfonylchloride), useful as a plasticizing agent.

Other modes of applying the principle of our invention may be employed, changes being made as regards to the details described, provided the features stated in any of the following claims or the equivalent of such be employed.

We, therefore, particularly point out and distinctly claim as our invention:

1. The method of making higher alkylnitrobenzene compounds, which comprises intimately contacting an alkylbenzene hydrocarbon whose alkyl group contains 11-14 carbon atoms with a mixture of sulfuric acid of at least 95% strength and nitric acid of at least 70% strength, said acids being present in the proportion of 2.2-3.5 mols of $H_2SO_4$ per mol of $HNO_3$.

2. The method as in claim 1, wherein the reaction is conducted at a temperature of 0 to 20° C.

MOSES CENKER.
WILLIAM K. LANGDON.

References Cited in the file of this patent

UNITED STATES PATENTS

| Number | Name | Date |
|---|---|---|
| 2,118,493 | Coffey et al. | May 24, 1938 |
| 2,288,392 | Davis | June 30, 1942 |
| 2,454,468 | McArdle | Nov. 23, 1948 |

FOREIGN PATENTS

| Number | Country | Date |
|---|---|---|
| 820,287 | France | Nov. 6, 1937 |

OTHER REFERENCES

Groggins, "Unit Processes in Organic Synthesis," pages 19, 20, 24-26, 49, and 50, McGraw-Hill Co., third edition, 1947.